(12) United States Patent
Baranov et al.

(10) Patent No.: US 9,366,552 B2
(45) Date of Patent: Jun. 14, 2016

(54) SEALED SENSOR ASSEMBLY

(71) Applicant: Engineering Seismology Group Canada Inc., Kingston (CA)

(72) Inventors: Alex Baranov, Kingston (CA); Wade Coulter, Kingston (CA); Keith Graham, Kingston (CA); Chris Hawryluck, Kingston (CA)

(73) Assignee: Egs Solutions Inc., Kingston (CA)

( * ) Notice: Subject to any disclaimer, the term of this patent is extended or adjusted under 35 U.S.C. 154(b) by 61 days.

(21) Appl. No.: 14/039,239

(22) Filed: Sep. 27, 2013

(65) Prior Publication Data
US 2014/0208847 A1 Jul. 31, 2014

Related U.S. Application Data

(60) Provisional application No. 61/756,942, filed on Jan. 25, 2013.

(51) Int. Cl.
*G01D 11/24* (2006.01)

(52) U.S. Cl.
CPC ........... *G01D 11/24* (2013.01); *Y10T 29/49117* (2015.01); *Y10T 29/49124* (2015.01)

(58) Field of Classification Search
CPC ...................................................... G01D 11/24
USPC .................................................. 29/825, 829
See application file for complete search history.

(56) References Cited

U.S. PATENT DOCUMENTS

| | | | |
|---|---|---|---|
| 4,109,717 A * | 8/1978 | Cooke, Jr. ................. | 166/250.1 |
| 4,693,910 A | 9/1987 | Nakajima et al. | |
| 5,860,483 A | 1/1999 | Havig | |
| 6,105,690 A * | 8/2000 | Biglin et al. .................... | 175/48 |
| 6,621,361 B1 * | 9/2003 | Fry ................................. | 331/69 |
| 6,724,319 B1 | 4/2004 | Knaack et al. | |
| 6,888,972 B2 | 5/2005 | Berg et al. | |
| 2006/0044939 A1* | 3/2006 | Shah et al. ...................... | 367/82 |
| 2006/0146646 A1* | 7/2006 | Fanini et al. .................... | 367/27 |
| 2007/0062274 A1* | 3/2007 | Chikenji et al. ............ | 73/152.55 |
| 2014/0076545 A1* | 3/2014 | Sutton et al. ............. | 166/250.01 |
| 2014/0208847 A1* | 7/2014 | Baranov et al. ................. | 73/431 |

* cited by examiner

*Primary Examiner* — Lisa Caputo
*Assistant Examiner* — Jamel Williams
(74) *Attorney, Agent, or Firm* — Marshall & Melhorn, LLC

(57) ABSTRACT

A sensor assembly for use in downhole deployment is disclosed. The assembly has a cylindrical housing having a hollow interior and a cartridge sub-assembly housed in the cylindrical housing. The cartridge sub-assembly has a sensor element, a first printed circuit board (PCB) securing the sensor element in a holding position, and a first potting sealing the first PCB and the sensor element in the holding position. The cartridge sub-assembly is secured in the hollow interior by a second potting. Additionally, a method of manufacturing the sensor assembly and an array of sensor assemblies are disclosed.

23 Claims, 5 Drawing Sheets

SEALED SENSOR ASSEMBLY

CROSS-REFERENCE TO RELATED APPLICATIONS

This Application claims the benefit of and priority to U.S. patent application Ser. No. 61/756,942 dated Jan. 25, 2013, the contents of which are incorporated herein by reference.

FIELD

This disclosure relates to a sealed sensor assembly, and in particular, to a sealed sensor assembly for used in downhole applications.

BACKGROUND

Micro-seismic monitoring is increasingly used to understand the geophysics which occur in the mineral extraction industries. A seismic event is generated through production activities, or through other sources. The propagation of micro-displacements through the earth is monitored, including the source and direction of P-waves and S-waves. This information provides insight into the geological formation, into its porosity, and into the structure of the earth surrounding the mineral deposit. This information may allow for determining where to apply pressure in order to extract oil from a petroleum reservoir while minimizing the loss of reservoir pressure, the leakage of oil product, and the waste of extraction fluids. Additionally, a seismic analysis of the earth surrounding an ore deposit may provide information regarding structural instability and possible drilling locations.

Thus, sensor assemblies are often deployed for downhole monitoring during mineral extraction, for example, during petroleum extraction and ore mining. Sensors may include any of geophone sensors for micro-seismic monitoring, temperature sensors and pressure sensors, amongst others. When a sensor assembly is deployed in a borehole, the sensor assembly is subjected to high temperature, pressure and other extreme environmental conditions. A sensor assembly is thus needed that is able to withstand extreme conditions during deployment.

SUMMARY

In one aspect of the disclosure, a sensor assembly is disclosed. The assembly has a cylindrical housing defining a hollow interior and a cartridge sub-assembly housed in the cylindrical housing. The cartridge sub-assembly has a sensor element, a first printed circuit board (PCB) securing the sensor element in a holding position, and a first potting sealing the first PCB and the sensor element in the holding position. The cartridge sub-assembly is secured in the hollow interior by a second potting.

In another aspect of the disclosure, the first PCB has a first cut-out portion defining the holding position, and a second PCB is mounted to the first PCB in an orthogonal locking relationship, the second PCB having a second cut-out portion defining the holding position. In some embodiments, each the first cut-out portion and the second cut-out portion define a plurality of holding positions securing a plurality of sensor elements.

In another aspect of the disclosure, the first PCB has a terminal positioned at an end of the first PCB for connecting the first PCB to a wire. The first PCB has a conductive signal trace for electrically coupling the sensor element with the terminal. The first PCB further may also have a gap portion at the end of the PCB, the gap portion being filled with the second potting.

In another aspect of the disclosure, the cylindrical housing also has a first open-end and a second open-end, the first open-end receiving a cable having a jacket and a plurality of wires secured in the jacket. The jacket may also be cut, thereby releasing one of the plurality of wires and wherein the one of the plurality of wires is connected to the terminal. The cable and the one of the plurality of wires are secured in the bore by the second potting.

In another aspect of the disclosure, the cylindrical housing also has a first end-cap secured to the first end and a second end-cap secured to the second end. One of the first end-cap and the second end-cap has a port for injecting the second potting. The port may be a National Pipe Taper Fuel (NPTF) port, which is then sealed with a dry seal plug. Each of the end-caps is secured to the cylindrical housing using an O-ring, and each of the end-caps is secured to the cable using an overmolded layer.

In another aspect of the disclosure, an array of sensor assemblies is disclosed. The array has a cable being received by the cylindrical housing of each of the sensor assemblies and a portion of the cable being secured in each of the cylindrical housings by the second potting. The cable has a jacket and a plurality of wires secured in the jacket. A wire of the plurality of wires is exposed from the jacket in each of the sensor assemblies and coupled to the sensor element.

In another aspect of the disclosure, a process for manufacturing a sensor assembly is disclosed. A cable is provided having a jacket and a plurality of wires secured by the jacket. The cable is passed through a bore of a first end-cap, the first end-cap having a port for receiving a second potting, and a wire of the cable is couple to a sensor element. The cable is passed through the hollow interior of the cylindrical housing and through a bore of a second end-cap. The first end-cap is secured to the first open-end of the cylindrical housing and the second end-cap to the second open-end of the cylindrical housing. A second potting is injected into the port of the first end-cap and the port is sealed.

In another aspect of the disclosure, the first and second end-caps are secured to the cable, for example, using an overmolded layer. The first and second end-caps are secured to the first and second open-ends of the cylindrical houses comprises using O-rings.

In another aspect of the disclosure, the jacket is cut to expose the wire; the wire is coupled to a PCB, the PCB being coupled to the sensor element.

In another aspect of the disclosure, a nipple is attached to the port to inject the second potting. The first and second pottings may be epoxy pottings.

In another aspect of the disclosure, the steps are repeated using the cable and a second sensor assembly, thereby forming an array of sensor assemblies.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present document describes a sensor assembly, a method for manufacturing the sensor assembly, and a method for producing an array of sensor assemblies. A cartridge sub-assembly for use in the sensor assembly is also described. The performance and durability of the cartridge sub-assembly can be pre-qualified prior to final assembly and deployment.

Figure 1A:
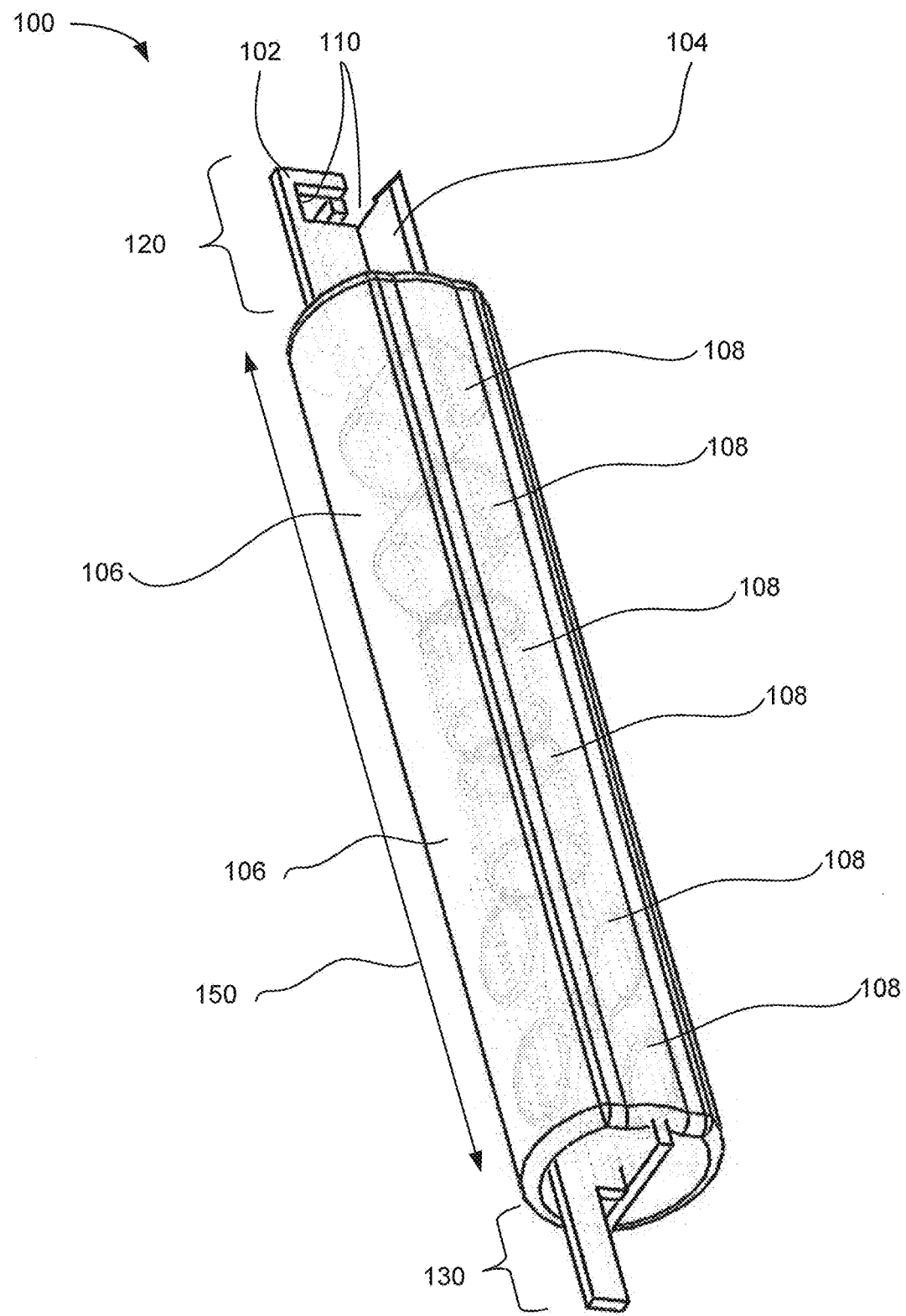
FIG. 1A is a perspective view of a cartridge sub-assembly of a sealed sensor assembly according to example embodiments.
Figure 1B:
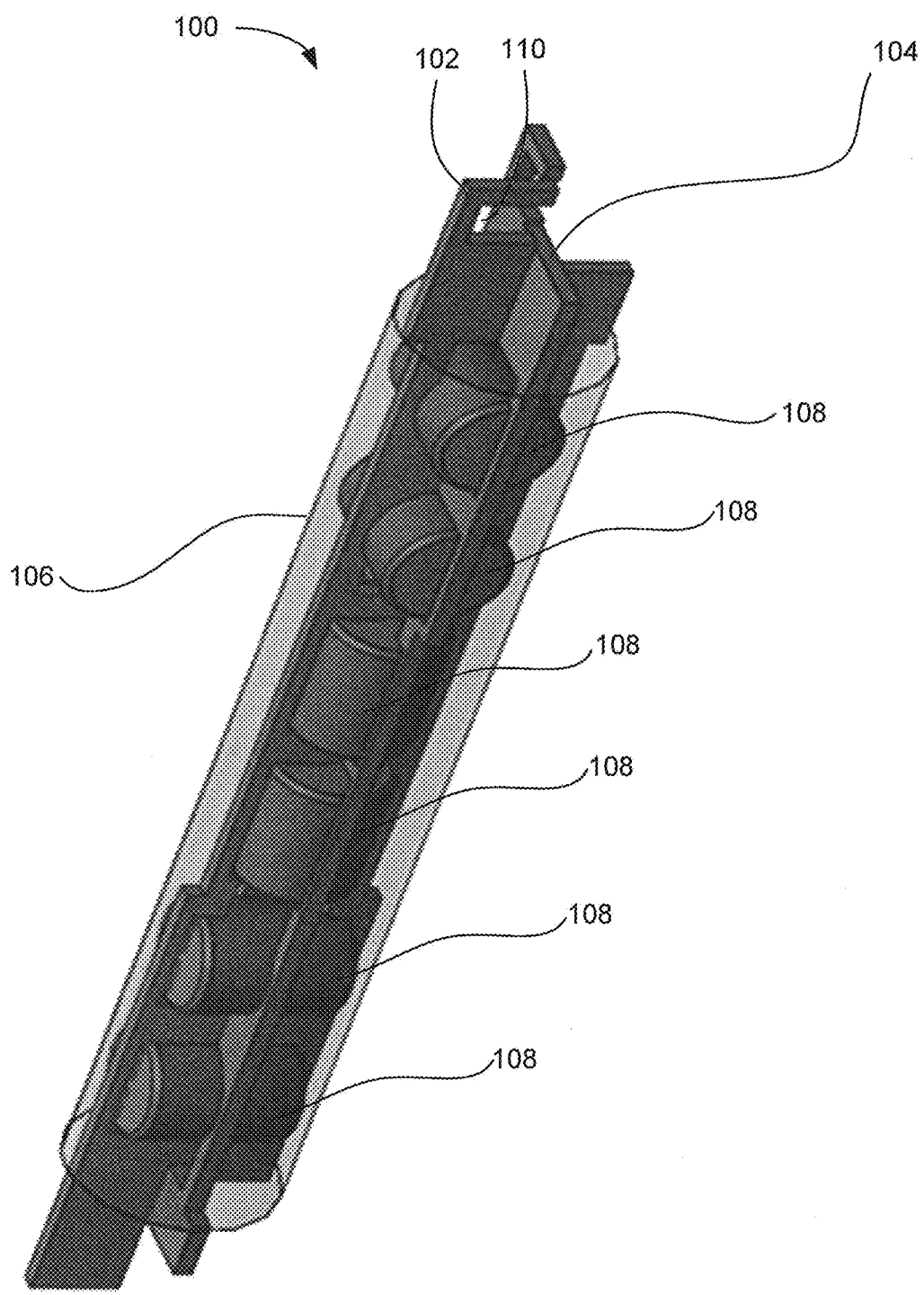
FIG. 1B is a cut-away perspective view of the cartridge sub-assembly of FIG. 1A.

FIGS. 1A and 1B illustrates an example of a cartridge sub-assembly 100 of a sensor assembly of the present disclosure. The cartridge sub-assembly 100 includes a plurality of sensor elements 108 that are mounted in printed circuit boards (PCBs) 102 and 104 and encapsulated in an encapsulation or potting 106. The cartridge sub-assembly 100 and the associated manufacturing process may in some example embodiments provide a modular design, such that each cartridge sub-assembly 100 has complete standalone functionality allowing for running a quality control procedure on the cartridge sub-assembly 100. The quality control procedure may feature a check for hydrostatic pressure-resistance through pressurization as well as checks for the quality and fidelity of the sensor signal by analyzing the response of the signal. Because the sub-assembly 100 is complete in its functionality, the above quality control checks can be used to confirm complete end-use functionality of a sensor array prior to its final assembly. Therefore, one of the advantages of this design in at least some applications is that it permits the sensor array which can, for example, be over 3000 meters in length, to be checked for hydrostatic pressure resistance prior to deployment by checking each individual cartridge sub-assembly 100. Due to the cumbersome length of the sensor array, completely checking the final tool array assembly that is thousands of meters in length for hydrostatic pressure resistance is difficult.

The materials employed to make the cartridge sub-assembly 100 are chosen such that bonding occurs between individual components which provides a pressure and temperature resistant encapsulation 106 of the sensor elements 108. In the example embodiment, seen in FIGS. 1A and 1B, the encapsulation material is a potting, such as an epoxy with ceramic additives. In one embodiment, an epoxy having a glass transition temperature of 105° C. is used. In other embodiments a high temperature epoxy which has a different glass transition temperature, for example in the 200° C. range, is used. Elongate printed circuit boards (PCBs) 102 and 104 are used as structural elements to hold the sensor elements 108 during the encapsulation process. In example embodiments, the PCBs 102, 104 are of grade FR4, made of a composite material composed of woven fiberglass cloth with an epoxy resin binder. The epoxy potting 106 will bond to the PCBs 102, 104 made from treated FR4 material, resulting in a pressure-resistant, water impermeable seal between the PCBs 102, 104 and the epoxy potting. Moreover, internal conductive traces inside PCBs 102, 104 conduct the sensor response signals from inside the epoxy potting to the outside of the encapsulation 106. Because these traces are internal to the PCBs 102, 204, they are physically sealed and prevent water when under hydrostatic pressure from migrating from outside into the encapsulation 106, using these electrical traces on the PCBs as conduits to reach the sensor elements 108.

In at least some example embodiments, the sensor elements 108 include any of geophones, temperature sensors (such as thermistors) and pressure sensors, all of which may be prone to failure if they were to become wet. The sub-assembly 100 may also include amplifiers in order to provide gain to the signals generated by the sensor elements 108 as they are transmitted to the surface.

In at least some embodiments, the structural PCBs 102, 104 are designed to lock together and locate the sensor elements 108, such as geophone pairs, in a mutually orthogonal concentric cylinder. In the example embodiment illustrated in FIGS. 1A and 1B, three pairs of geophone sensor elements 108 are included, with each pair being oriented to have a sensitive axis orthogonal to the other two pairs of geophone sensor elements 108. This orthogonality improves accuracy when detecting the source and direction of P-waves and S-waves because the dip and azimuth of the seismic pulses can be more accurately calculated.

In example embodiments, the PCBs 102, 104 and the sensor elements 108 are overmolded in a split cavity mold. The mold thus may minimize cavity pressure when injecting epoxy, in order that the sensor elements 108 do not deform and are not penetrated by the molded encapsulant 106. Subsequent to molding, the cartridge sub-assembly 100 is removed from the mold and post-treated using a heat schedule which may minimize residual stresses which results from the thermal expansion of the PCBs 102, 104 and the sensor elements 108.

Figure 2:
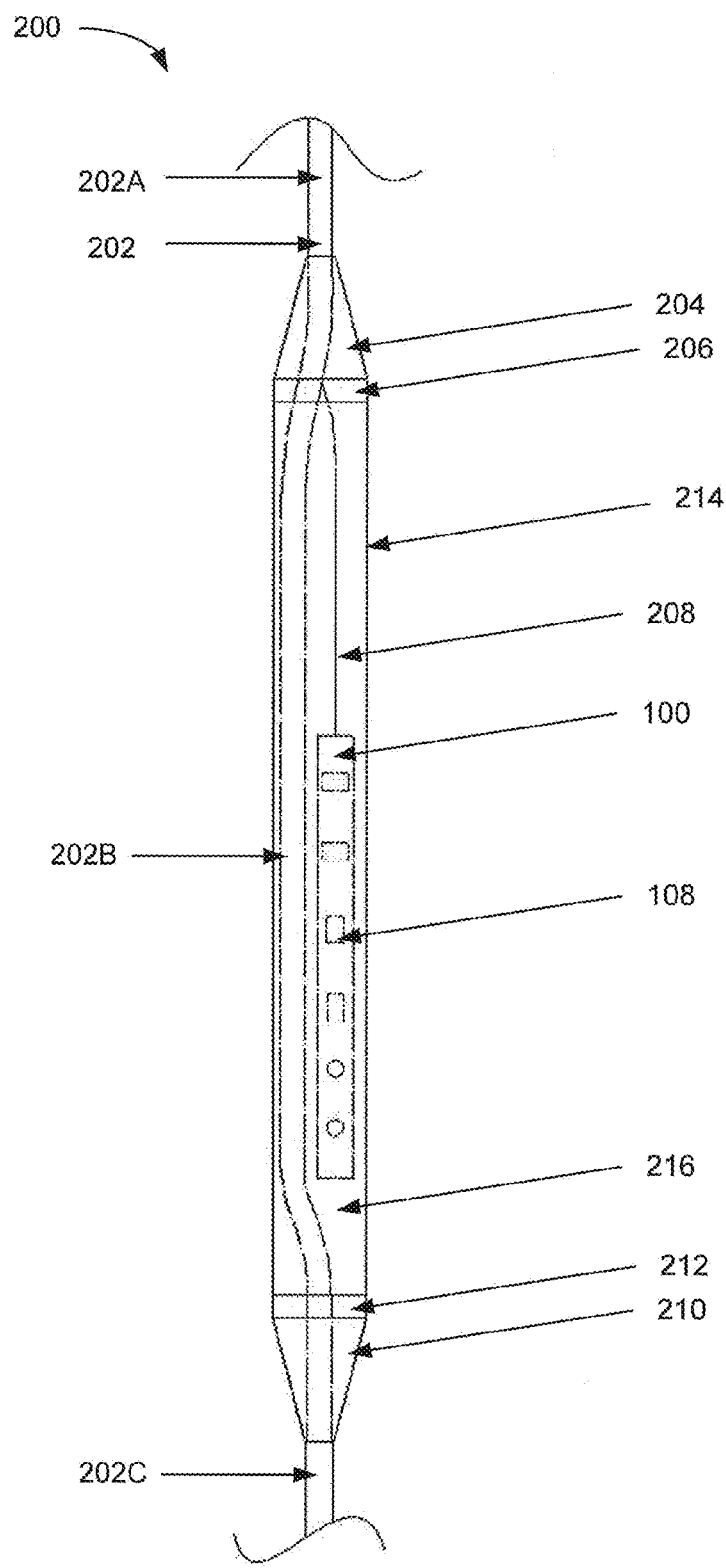
FIG. 2 is a plan view illustrating a sensor assembly using the cartridge sub-assembly of FIG. 1A according to example embodiments.
Figure 3A:
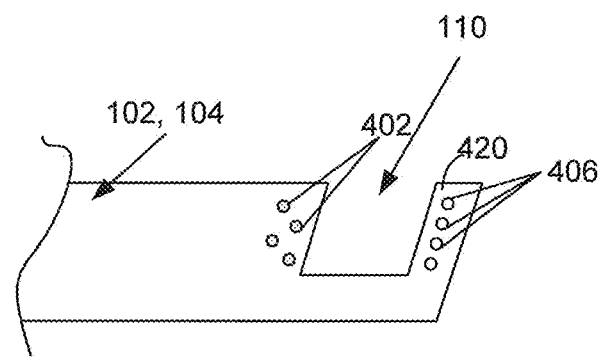
FIG. 3A is a perspective view illustrating terminals of a PCB used in the cartridge sub-assembly of FIG. 1A according to example embodiments.
Figure 3B:
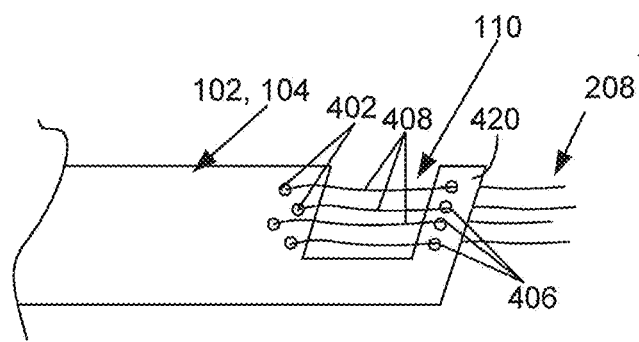
FIG. 3B is a perspective view illustrating terminals of a PCB used in the cartridge sub-assembly of FIG. 1A connected to wires according to example embodiments.

A plurality of sensor sub-assemblies 100 are mounted in respective housings along a cable 202 to form a string or array of sensor assemblies 200, a portion of which is shown in FIG. 2. In the final assembly process of the sensor assembly 200 shown in FIG. 2, the encapsulated cartridge sub-assembly 100 is positioned along a length of seismic cable 202 at a desired location for the cartridge sub-assembly 100. Three twisted-pair wires 208 are cut from the seismic cable 202 and attached to terminals 402 on the PCBs 102, 104 of the cartridge sub-assembly 100, as shown in FIGS. 3A and 3B. Each terminal 402 couples one of three seismic channels (each channel being associated with a respective pair geophone sensor elements 108) to the cable 202. In an example embodiment, four terminals 402 are included on PCB 102, providing electrical connections to two geophone pairs and two terminals 402 are included on PCB 104, proving electrical connections to a third geophone pair. The remaining twisted pairs in the seismic cable 202 that are not connected to the specific cartridge sub-assembly 100 are tied along the length of the cartridge sub-assembly 100. These remaining seismic twisted pairs pass through the sensor assembly 200 within the seismic cable 202 to consecutive sensor assemblies 200 lower down in a sensor array. A stainless steel cylindrical housing 214 is placed over the cartridge sub-assembly 100 and the seismic cable 202. End-caps 204, 210 are fed over the seismic cable 200 and attached to the stainless steel cylindrical housing 214 using O-rings 206, 212 respectively. The end-caps 204, 210 are then overmolded to the seismic cable 202; thus providing a watertight bond. A primary watertight seal is created at the cartridge sub-assembly 100 by the potting 106; thus the external seals for the sensor assembly created by using O-rings 206, 212 to seal the end-caps to the stainless steel cylindrical housing 210 and by using an overmold to seal the end-caps 204, 210 to the seismic cable 202 are redundant, secondary seals.

Voids formed inside the sensor assembly 200 in the cylindrical housing 214 surrounding the cartridge sub-assembly 100 are filled with potting which may be of the same encapsulant material used to mold the cartridge sub-assembly. In this way, good transmissibility of seismic events is ensured from the outside of the sensor assembly, through the cartridge sub-assembly and into the sensor elements 108.

Accordingly, in the embodiments described herein, the cartridge sub-assembly 100 acts as a primary seal for the sensor elements 108, while the external pod housing 214 performs the function of a secondary seal. The modular sub-assembly 100 is, at least some example embodiments, a standalone module in that it is complete in its functionality and can thus be pre-qualified or tested physically and electrically as an individual unit, permitting the final end-use functionality of each sensor sub-assembly in the entire sensor array to be verified prior to final assembly. In at least some example embodiments, the disclosed design features a structure in which all sensor elements are concentric.

Accordingly, described herein is an improved downhole micro-seismic sensor assembly, which in at least some applications may provide improved long term reliability. The cartridge sub-assembly 100 is manufactured prior to the final assembly of the sensor assembly 200. The cartridge sub-assembly 100 allows a more controlled epoxy-potting process which offers improved sealing, increased impact resistance, and which resists the development of cracks in the cartridge sub-assembly 100. Moreover, pressure testing each cartridge sub-assembly 100 individually prior to forming an array of sensor assemblies 200 is now possible, thereby better ensuring quality of the array of sensor assemblies 200 prior to customer delivery. This step makes the sensor assembly 200 quality control process more rigorous, thereby helping to ensure the sensor assembly 200 meets reliability standards during use in downhole deployment at depth under hydrostatic pressure.

The PCBs 102, 104 are chosen as structural members to contain the sensor elements 108 because of the adhesion properties of epoxy potting compounds to the PCBs. The adhesion creates a primary seal between the sensor elements 108 and external hydrostatic pressure from the well during deployment of the array of sensor assemblies 200. In the sensor assembly 200, a secondary seal is created when the cartridge sub-assembly 100 is inserted into the cylindrical housing 214 which has end-caps 204, 210 overmolded onto a polyurethane jacket of the cable 202. In order to secure the cartridge sub-assembly 100 within the cylindrical housing 214, a second epoxy potting 216 is completed to surround the cartridge sub-assembly 100 in the housing 214. Water is prevented from migrating from outside of the PCBs 102, 104 into the primary seal created by the potting 108 around cartridge sub-assembly 100 along the electrical conductors to the sensor elements 108 because the electrical conductors which couple the sensor elements 108 to the terminals 402 located at an end of the PCBs 102, 104 are embedded and concealed within the PCBs 102. As seen in FIGS. 1 and 2A, the PCBs 102, 104 each include a gap portion 110 providing strain relief for the wires 208 that connect to terminals 406. In this way the risks of breaking the electrical connections to the sensor elements 108 due to impact are mitigated. In particular, as seen in FIGS. 3A and 3B, in an example embodiment the gap portion 110 separates a distal end region 420 of the PCB 102, 104 from the rest of the PCB. Through-holes 406 are provided through the end region 420, with each wire 408 passing through a respective through-hole 406, passing over gap portion 110, and terminating in an electrical connection at a respective terminal 402.

In the secondary seal, when epoxy 216 is potted over the sub-assembly cartridge 100 inside the cylindrical housing 214, the individual wires 208 which are connected to the PCB 102 have epoxied sections 408 which are strain-relieved by the gap portion 110 of the PCB. Epoxy bonds well to magnet wire and as such, an additional sealing is created which eliminates the potential for water to migrate from the twisted pair wires 208 into the cartridge sub-assembly 100.

In order to seal the cartridge sub-assembly 100, epoxy potting compounds can be selected based on the epoxy's tensile strength, low moisture absorption, temperature stability, impact resistance, as well as low shrinkage during molding.

During the molding process, the molding parameters of temperature and humidity can be better controlled in an enclosed chamber, because the cartridge sub-assembly 100 is molded as a standalone unit, free of the cylindrical housing 214 and the seismic cable 202. The shot (i.e. the volume of material used to fill the mold cavity) is better assured because of the improved benefits of a dedicated mold which has better venting and optimal location of the injection gates. This potting process will help ensure that there are no air-bubbles trapped within the potting which can create a conduit for water to migrate through in the event that the secondary seal created by the cylindrical housing 214 is breached.

Moreover, once molded, the cartridge sub-assembly 100 can be inspected and tested as a standalone unit free of the external cylindrical housing 214. The cartridge sub-assembly 100 can be visually inspected for air bubbles and cracks, which may form due to mold shrinkage. As a second step in the quality control procedure, pressure testing can be done on each cartridge sub-assembly 100. Each cartridge sub-assembly 100 can also be checked for electrical resistance, sensitivity, and frequency response.

The additional controls in the manufacturing process of the sensor assembly 200 test the sensor assembly 200 for robustness against impact, crushing and thermal cycling. The perpendicularity of the PCB boards 102, 104 also allows for the sensor elements 108 to be surrounded by a uniform and controlled amount of epoxy potting in encapsulation 106, thereby improving impact resistance. Moreover mold shrinkage can be better controlled, because of the improved molding process, which thus eliminates residual stresses and better resists the development of cracks in the cartridge sub-assembly 100. The sensor elements 108 will better resist impact and thermal cycling when under hydrostatic pressure, since it is devoid of cracks in the epoxy potting 106.

The use of the cartridge sub-assembly 100, as presently described in the embodiments helps mitigate the risks associated with the common failure modes for downhole sensor arrays, which include breach of the seals, breaks in the electrical connections to the sensor elements 108, cracks developing due to thermal cycling and loss of operation of the sensor elements 108 due to impact.

A description of a cartridge sub-assembly and resulting sensor array having been provided, the process of assembly of the cartridge sub-assembly and resulting sensor array will now be described according to example embodiments. As will be apparent from the above description and the Figures, the cartridge sub-assembly 100 includes elongate first PCB 102 and second PCB 104 providing a support structure for positioning sensor elements 108. The first PCB 102 and the second PCB 104 are positioned orthogonal to each other along a common elongate axis. Each of the PCBs 102, 104 have cut-out portions as seen in FIG. 1B in the shape of a sensor element 108 to define a holding position for securing the sensor element or elements 108.

The second PCB 104 is positioned parallel to the longitudinal axis 150 of the cartridge sub-assembly 100 and extends from a first end 120 of the cartridge sub-assembly 100 to a second end 130 of the cartridge sub-assembly 100. The second PCB 104 also has a slotted cut-out portion along its center, where the first PCB 102 is secured in an orthogonal locking relationship with the second PCB 104. Accordingly both the first and second PCB 102, 104 are in the parallel position along the longitudinal axis 150.

When in the orthogonal locking relationship, the cut-out portion or portions of the second PCB 104 is/are aligned with the cut-out portion or portions of the first PCB 102. The alignment of the cut-out portions further defines the holding position for each sensor element 108. When multiple sensor elements 108 are needed, multiple holding positions are provided. By manipulating the orientation of the cut-out portions, some of the holding positions will hold the sensor element 108 in an orientation parallel to the axis 150, while some of the holding positions will hold the sensor element 108 in an orientation orthogonal to the axis 150, as best shown in FIG. 1B.

In one embodiment, to secure the PCBs 102 and 104 in the orthogonal locking relationship, one or more of sensors 108 is secured to the first PCB 102, for example by soldering. Any remaining sensors 108 are loosely centered in the cut-out portions of the first PCB 102. The second PCB 104 is then secured into the slotted cut-out portion of the first PCB 102. The remaining sensors 108 are then secured to the second PCB 104, for example by soldering; thereby locking the first and second PCBs 102 and 104 to one another.

In one embodiment, the PCBs 102, 104 are of grade FR4, made of a composite material composed of woven fiberglass cloth with an epoxy resin binder.

In one embodiment, the sensor elements 108 are geophone sensors for measuring seismic response, operating in mutually orthogonal pairs. The orthogonality of the orthogonal pairs improves accuracy when detecting the source and direction of P-waves and S-waves because the dip and azimuth of the seismic pulses can be more accurately calculated. In some embodiments, the geophone sensors may be adapted to detect high frequency, micro-seismic displacements, in which case a geophone with a cut-off frequency of 15 Hz is used. In some embodiments the geophone sensors may be adapted to detect large seismic displacement, such as displacements occurring near ground level, in which case a geophone with a 4.5 Hz cut-off frequency is used. Various other sensor elements 108 may also be used, including, without limitation, accelerometers, tilt sensors, and temperature sensors.

To electrically couple each sensor element 108 to one of the PCBs 102, 104, terminals are provided on the surface of the PCB 102 or 104, positioned in each of the cut-out portions. Additionally, a terminal on the surface of the sensor element 108 is positioned such that the sensor terminal and the PCB terminal are in contact when the sensor element 108 is secured in the holding position; thereby the sensor element 108 is electrically coupled to the PCB 102 or 104. As previously discussed, each of the PCBs 102, 104 has internal signal traces (not shown) for coupling electrical signals to and from each sensor element 108 and a terminal 402 located at the first end 120 of the PCBs 102, 104.

A cable 202, as shown in FIG. 2, is provided in the manufacturing of the sensor array 200, and is used to couple multiple sensor assemblies 200 to form an array of sensor assemblies 200. The cable 202 is made up of multiple wires 208, the wires corresponding with the number of sensor assemblies 200 in the array and the number of sensor elements 108 in each sensor assembly. The plurality of wires 208 are secured by a jacket; thereby sealing the wires 208 from environmental conditions and providing added insulation to the wires 208.

Each sensor assembly 200 may have a set of wires 208 allocated to it. In some embodiments, the wires 208 may be color coded, to provide an indication of the groupings of wires 208 based on which sensor assembly the wire connects to.

Provided at the first end 120 of one or both of the PCBs 102, 104 are one or more terminal 402 as shown in FIGS. 3A and 3B for electrically coupling the sensor elements, via the PCB, with a cable 202. The number of the terminals 402 will correspond with the number of sensor elements 108 in the cartridge sub-assembly 100. Each sensor element 108 will require at least two terminals of each of the terminals 402, one positive terminal, and one negative terminal. Additional terminals may be required if the sensor element 108 is a digital sensor element.

For each sensor assembly 200, only the wires 208 corresponding with the sensor elements 108 of that particular sensor assembly 200 are released from the jacket. The wires 208 are coupled to the terminals 402, as shown in FIG. 3B. The terminals 402 may directly couple the wires 208 with the sensor elements 108, via one of the PCBs 102, 104.

However, in some embodiments, also provided at the first end 120 of one or both of the PCBs 102, 104 is a gap portion 110 and additional terminals 406. The gap portion 110 separates the terminals 402 from the terminals 406. The number of terminals 406 corresponds with the number of terminals 402. Each of the terminals 406 is coupled with a terminal 402 by a magnet wire 408. The magnet wires 408 are thus able to bond with the potting 106 in the area of the gap portion 110. Additionally, the magnet wires 408 and the potting 106 may be chosen such that they are well suited for bonding with one another.

The gap portion 110 also provides strain relieve to the wires 408 and further isolates the PCBs 102, 104 from liquids that may be present in the sensor assembly 200. Maintaining an electrical connection between the sensor elements 108 and the cable 202 is essential for the sensor assembly 200 to function. The gap portion 110 helps in maintaining this connection.

The first and second PCBs 102, 104 and the sensor elements 108 are then placed in a split cavity mold. While the first and second PCBs 102, 104 and the sensor elements 108 are in the mold, the mold cavity is injected with a potting. The potting 106 may be an epoxy potting with ceramic additives, having a glass transition temperature of 105° C.; however, other embodiments may use a high temperature epoxy which has a glass transition temperature in the 200° C. range.

In some embodiments, the mold has an opening in a top portion of the mold; thus, the mold is open to the atmosphere. The mold thus reduces cavity pressure when injecting potting, as air is evacuated through the opening. The reduced cavity pressure helps to prevent the sensor elements 108 from being deformed. Additionally, any surplus potting injected into the cavity is forced out of the opening; thereby helping to reduce cracking of the potting 106 after the potting has set.

Once the cartridge sub-assembly 100 is removed from the mold, the potting 106 has formed a cylindrical encapsulation surrounding the first and second PCBs 102, 104 and the sensor elements 108. However, the mold is such that the potting 106 does not encapsulate the first end 120 and the second end 130 of the PCB, ensuring that the terminals 402 and 402 are not covered with the potting.

The cartridge sub-assembly 100 is then removed from the mold and heated. In one embodiment, the cartridge sub-assembly is heated in a heat chamber from room temperature to a higher target temperature. The cartridge sub-assembly 100 is then allowed to return to room temperature again. The heating and cooling process helps to minimize any residual stresses resulting from thermal expansion and/or contraction of the PCB 102, 104 and the sensor elements 108.

The PCBs 102, 104 and the sensor elements 108 of the cartridge sub-assembly 100 are thus sealed in the holding position by the potting 106. The potting 106 provides a primary watertight seal to the PCBs 102, 104 and the sensor elements 108; thus allowing for individual testing of each cartridge sub-assembly 100. The testing procedure for each cartridge sub-assembly 100 may vary depending on the deployment requirements of the cartridge sub-assembly 100, the PCBs 102, 104 used, the number of sensor elements 108 used, and the type of sensor elements 108 used. However, in one embodiment using geophone sensor elements the testing procedure is as follows. Each cartridge sub-assembly 100 is inspected to ensure the geophone channel sensitivity, damping, resistance, roll-off frequency, noise leakage, and distortion parameters of the cartridge sub-assembly 100 are within the required tolerance. The cartridge sub-assembly 100 is then pressurized in a pressure vessel at a high pressure, for example at 3500 psi for twenty hours or longer. After the cartridge sub-assembly 100 is removed from the pressure vessel, the cartridge sub-assembly 100 is further inspected to ensure any of the geophone channel sensitivity, damping, resistance, roll-off frequency, noise leakage, and distortion parameters of the cartridge sub-assembly 100 are within the required tolerance. A pulse signal is sent to each geophone sensor element 108 and the signal response is analyzed to determine if any geophone sensor element 108 is unresponsive, for example because it is blocked, wet, or otherwise. Additional optional testing using a shaking table may also be performed, by placing the cartridge sub-assembly 100 on the shaking table while the geophone channel sensitivity is measured for a range of frequencies to ensure the parameters are within the required tolerance.

Figure 4:
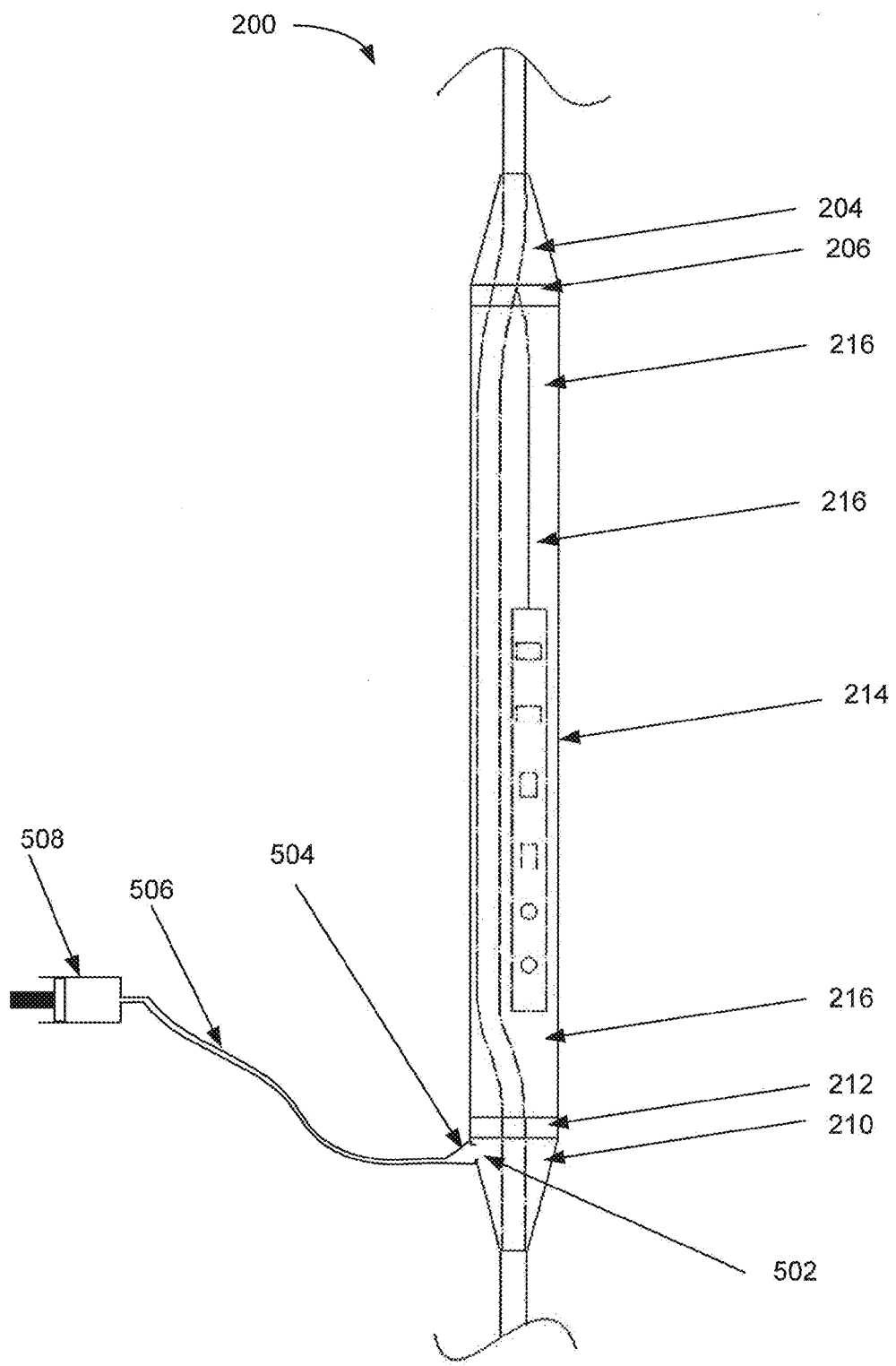
FIG. 4 is a plan view illustrating the potting process of the sensor assembly of FIG. 2 according to example embodiments.

Once the manufacturing and testing process of the cartridge sub-assembly 100 is complete, for added protection during use, the cartridge sub-assembly 100 is housed in a hollow interior of a cylindrical housing 214, as shown in FIGS. 2 and 4. The cylindrical housing 214 is an elongate cylindrical tube, defining the hollow interior and has two open-ends at both the top and bottom of the cylinder for receiving the cable 202. The cylindrical housing 214 will also house at least a portion of the cable 202 and will be sealed using an end-cap 204, 210 at each end. The cylindrical housing 214 can be made from a number of materials, including, without limitation, stainless-steel carbon steel, a fluoropolymer such as perfluoroalkoxy (PFA), or polyether ketone (PEEK). The end-caps 204, 210 can be also be made from a number of materials, including, without limitation, stainless-steel carbon steel, a fluoropolymer such as perfluoroalkoxy (PFA), or polyether ketone (PEEK).

The cable 202 is comprised of at least three portions, a mid-portion 202B housed in the cylindrical housing 214, and two end-portions 202A, 202C for connecting the sensor assembly 200 other sensor assemblies and/or a control unit for receiving sensor assembly data. Each end-cap 204, 210 has a bore in the center thereof; allowing for the cable 202 to be passed though. A first end-cap 204 is passed through the end-portion 202A of the cable 202, followed by an O-ring 206. The O-ring is used to secure the end-cap 204 to the cylindrical housing 214. The mid-portion of the cable 202B can thus be housed in the cylindrical housing 214.

The jacket of the cable 202 securing the wires 208 is then cut, at the portion 202B, to release at least one wire 208 inside the cylindrical housing 214 for coupling with the sensor elements 108 of the cartridge sub-assembly 100 via terminals 402. Since the cable 202 is for connecting multiple sensor elements 108 in multiple cartridge sub-assemblies 100 for forming an array of sensor assemblies 200, the cable 202 will include more wires 208 than needed for the sensor elements 108 of a single cartridge sub-assembly 100. Thus, only a subset of the wires of the cable 202 will be used in each sensor assembly 200. The wires 208 that are needed to couple the sensor elements 108 of the cartridge sub-assembly 100 are cut, released from the jacket and stripped down from the insulating material at an end thereof, then coupled to one of the PCBs 102, 104 (for example, by soldering). The remaining wires 208 are untouched and may be color coded to allow them to be easily identified. For example, the manufacturer of the cable 202 will provide a cable for connecting twenty cartridge sub-assemblies 100 in an array, each having two sensor elements 108. Thus, the cable 202 will include two wires for each of the forty sensor elements in the array; i.e. eighty wires. Each of the eighty wires will have a different color or color combination to identify the sensor element it is intended for. The cable 202 may further be custom designed for each specific array.

The cartridge sub-assembly 100 is then attached to the cable portion 202B of the cable, for example using an electrical tape, and the wires 208 are then secured to the terminals 402, for example by soldering.

After the cartridge sub-assembly 100 has been coupled to the wires 208, the end 202C of the cable 202 is then passed through bore of the cylindrical housing 214. The cylindrical housing 214 will therefore enclose the mid-portion of the cable 202B and the cartridge sub-assembly 100, including the PCBs 102, 104 and the sensor elements 108.

A second O-ring 212 is then passed through the end 202C of the cable, followed by a second end-cap 204. Each end-cap 204, 210 has a cylindrical end configured to securely engage an open-end of the cylindrical housing 214; thereby forming a tight fit. The cylindrical end of each of the end-caps 204, 210 are secured to the cylindrical housing 214 with O-rings 206, 212 respectively.

One of the two end-caps 204, 206 also has a port 502, as illustrated in FIG. 4. The port 502 will in some embodiments be National Pipe Taper Fuel (NPTF) port. The port 502 is an opening through the end-cap allowing for a potting 216 to be injected into the cylindrical housing 214. As illustrated in FIG. 4, a nipple 504 is secured to the port 502. The nipple 504 protrudes outwardly and has a bore therein and is inserted into the port 502. The nipple 504 allows for connecting a tubing 506 for injecting the potting 216. In some embodiments, the sensor assembly 200 is positioned such that the end-cap having the port 502 is at the bottom when the potting 216 is injected into the cylindrical housing 214; thus ensuring that any air present in the cylindrical housing 214 can escape from the top end-cap. The potting 216 may be of the same material as the potting 106; i.e. an epoxy potting with ceramic additives, having a glass transition temperature of 105° C.; however, other embodiments may use a high temperature epoxy which has a glass transition temperature in the 200° C. range. The potting 216 may be injected into the tubing 506 using an epoxy dispenser 508 such as a gun. The potting is injected into the cylindrical housing 214 via the tubing 506 until the cylindrical housing 214 is void of air.

The cylindrical housing 214 thus contains the second potting 216, which secures the mid-portion of the cable 202B, and the cartridge sub-assembly 100 (including the PCBs 102, 104, the sensor elements 108 and the potting 106 encapsulating the PCBs 102, 104 and the sensor elements 108) in the hollow interior of the cylindrical housing.

The second potting 216 encapsulates the PCBs 102, 104 in their entirety including the gap portion 110, the first and second ends 120, 130 of the PCBs 102, 104 that are not encapsulated by the first potting 106. The second potting 216 also encapsulates the mid-portion of the cable 202B, the wires 208, and the magnet wires 408. The second potting 216 helps to provide an improved sealing for the sensor elements 108 by creating a secondary seal around the sensor elements 108.

Following the injection of the potting 216, the nipple 504 is removed and the port 502 is sealed. In one example, the port 502 is sealed using a $\frac{1}{16}^{th}$ inch NPTF dry-seal plug. The end-caps 204, 210 are then overmolded, to help to provide an improved sealing between the jacket of the cable 202 and the end-caps 204, 210.

In one embodiment, each of the end-caps 204, 210 is overmolded using a mold pre-heated to a target temperature. For enhanced adhesion to the jacket of the cable 202, the end-caps 204, 210 may optionally be treated with an adhesion promoter and the jacket may optionally be chemically treated to enhance bonding with the end-caps 204, 210. The sensor assembly 200, including the end-caps 204, 210 and the cable 202, is then heated to a temperature in the same range as that of the target temperature. A pre-heated mold is then placed around each of the end-caps 204, 210 and injected with overmolding compound. The mold is then heat-cured until the compound hardens.

When the sensor assembly 200 is for use in an array of a plurality of sensor assemblies 200, additional cartridge sub-assemblies 100 are coupled to the cable 202 in a similar manner, then housed in a cylindrical housing 214 and secured with a second potting 216, as explained above. The cable is received by each cylindrical housing of each of the sensor assemblies. A portion of the cable is secured and sealed in each cylindrical housing by the second potting. A number of wires of the cable 202 are exposed from the jacket in each cylindrical housing to couple the sensor elements for each cartridge sub-assembly as previously explained. The cable 202 may also be secured to each cylindrical housing by overmolded end-caps at each end of each cylindrical housing, in addition to the second potting 216.

Accordingly, a sensor assembly 200 suitable for use in a sensor array is disclosed. The sensor assembly 200 includes a cylindrical housing 214 defining a hollow interior for protecting and housing the cartridge sub-assembly 100. The cartridge sub-assembly 100 is secured in the hollow interior of the cylindrical housing 214 by a potting 216. The cartridge sub-assembly 100 includes a sensor element 108, a first printed circuit board (PCB) 102 securing the sensor element 108 in a holding position, and a potting 106 sealing the first PCB 102 and the sensor element 108 in the holding position. The sensor element 108 is thus protected from external environmental conditions by the cylindrical housing 214, the potting 216, and the potting 106; thus, the sensor element 108 is suited for down-hole deployment for long periods of time where external environmental conditions are expected to be harsh.

Certain adaptations and modifications of the described embodiments can be made. Therefore, the above discussed embodiments are considered to be illustrative and not restrictive.

What is claimed is:

1. A sensor assembly comprising:
   a cylindrical housing defining a hollow interior;
   a cartridge sub-assembly housed in the hollow interior, the cartridge sub-assembly comprising a sensor element, a first printed circuit board (PCB) securing the sensor element in a holding position, and a first potting sealing the first PCB and the sensor element in the holding position, the first potting encapsulating the sensor element and forming a water impermeable seal between the sensor element and the first PCB;
   wherein the cartridge sub-assembly is secured in the hollow interior by a second potting.

2. The sensor assembly of claim 1, wherein the first PCB comprises a first cut-out portion defining the holding position.

3. The sensor assembly of claim 2, further comprising a second PCB mounted to the first PCB in an orthogonal locking relationship, the second PCB comprising a second cut-out portion defining the holding position, wherein each the first cut-out portion and the second cut-out portion define a plurality of holding positions for securing a plurality of the sensor elements.

4. The sensor assembly of claim 1, wherein the first PCB comprises a terminal positioned at an end of the first PCB that extends beyond the first potting for connecting the first PCB to a wire, the wire being electrically coupled to the sensor element by a conductive signal trace in the first PCB, wherein the conductive signal trace transmits signals from the sensor element within the first potting to the terminal outside of the first potting.

5. The sensor assembly of claim 4, wherein the first PCB further comprises a gap portion at the end of the PCB, the gap portion being filled with the second potting.

6. The sensor assembly of claim 4, wherein the cylindrical housing further comprises a first open-end and a second open-end, the first open-end receiving a cable having a jacket and a plurality of wires secured in the jacket.

7. The sensor assembly of claim 6, wherein at least one of the plurality of wires is released from the jacket for connecting to the terminal.

8. The sensor assembly of claim 7, wherein the cable and the one of the plurality of wires are secured in the bore by the second potting.

9. The sensor assembly of claim 1, wherein the cylindrical housing further comprises a first open-end and a second open-end and further comprising a first end-cap secured to the first end and a second end-cap secured to the second end.

10. The sensor assembly of claim 9, wherein the each of the open-ends receives a cable, and wherein each of the end-caps is secured to the cable using an overmolded layer.

11. An array of sensor assemblies as claimed in claim 1, the array comprising:
    a cable being received by the cylindrical housing of each of the sensor assemblies, a portion of the cable being secured in the cylindrical housing of each sensor assembly by a potting; and
    the cable having a jacket and a plurality of wires secured in the jacket, wherein a wire of the plurality of wires is exposed from the jacket in each of the sensor assemblies and coupled to the sensor element.

12. The array of sensor assemblies of claim 11, wherein each sensor assembly further comprises a first end-cap and a second end-cap, the first and second end-caps being secured to the cylindrical housing and the cable.

13. The array of sensor assemblies of claim 12, wherein each of the end-caps is secured to the cable using an overmolded layer.

14. A process for manufacturing a sensor assembly, the sensor assembly comprising a cylindrical housing having a hollow interior, a first open-end and a second open-end, a sensor element, the sensor element being sealed in a first potting and housed in the cylindrical housing, the process comprising the steps of:
providing a cable having a jacket and a plurality of wires secured by the jacket;
passing the cable through a bore of a first end-cap, the first end-cap having a port for receiving a second potting;
coupling a wire of the plurality of wires to the sensor element;
passing the cable through the hollow interior of the cylindrical housing and through a bore of a second end-cap;
securing the first end-cap to the first open-end of the cylindrical housing and the second end-cap to the second open-end of the cylindrical housing;
injecting a second potting into the port of the first end-cap; and
sealing the port.

15. The process of claim 14, further comprising securing the first and second end-caps to the cable using an overmolded layer.

16. The process of claim 14, wherein securing the first and second end-caps to the first and send open-ends of the cylindrical houses comprises using a first and second O-ring.

17. The process of claim 14, further comprising cutting the jacket to expose the wire of the plurality of wires.

18. The process of claim 14, wherein coupling the wire of the plurality of wires to a sensor element comprises coupling the wire to a PCB, the PCB being coupled to the sensor element.

19. The process of claim 14, wherein the first and second pottings are epoxy pottings.

20. The process of claim 14, further comprising repeating the steps of claim 14 using the cable and a second sensor assembly, thereby forming an array of sensor assemblies.

21. A sensor assembly comprising:
a cylindrical housing defining a hollow interior;
a cartridge sub-assembly housed in the hollow interior, the cartridge sub-assembly comprising a sensor element, a first printed circuit board (PCB) securing the sensor element in a holding position, and a first potting sealing the first PCB and the sensor element in the holding position;
wherein the cartridge sub-assembly is secured in the hollow interior by a second potting;
wherein the first PCB comprises a first cut-out portion defining the holding position; and
further comprising a second PCB mounted to the first PCB in an orthogonal locking relationship, the second PCB comprising a second cut-out portion defining the holding position, wherein each the first cut-out portion and the second cut-out portion define a plurality of holding positions for securing a plurality of the sensor elements.

22. A sensor assembly comprising:
a cylindrical housing defining a hollow interior, having a first open-end and a second open-end;
a cartridge sub-assembly housed in the hollow interior, the cartridge sub-assembly comprising a sensor element, a first printed circuit board (PCB) securing the sensor element in a holding position, and a first potting sealing the first PCB and the sensor element in the holding position, wherein the cartridge sub-assembly is secured in the hollow interior by a second potting;
a first end-cap secured to the first open-end and a second end-cap secured to the second open-end of the cylindrical housing, wherein the each of the open-ends receives a cable, and wherein each of the end-caps is secured to the cable using an overmolded layer.

23. An array of sensor assemblies, the array comprising:
a plurality of sensor assemblies each comprising: (i) a cylindrical housing defining a hollow interior; (ii) a cartridge sub-assembly housed in the hollow interior, the cartridge sub-assembly comprising a sensor element, a first printed circuit board (PCB) securing the sensor element in a holding position, and a first potting sealing the first PCB and the sensor element in the holding position, wherein the cartridge sub-assembly is secured in the hollow interior by a second potting;
a cable being received by the cylindrical housing of each of the sensor assemblies, a portion of the cable being secured in the cylindrical housing of each sensor assembly by a potting; and
the cable having a jacket and a plurality of wires secured in the jacket, wherein a wire of the plurality of wires is exposed from the jacket in each of the sensor assemblies and coupled to the sensor element.

* * * * *